UNITED STATES PATENT OFFICE.

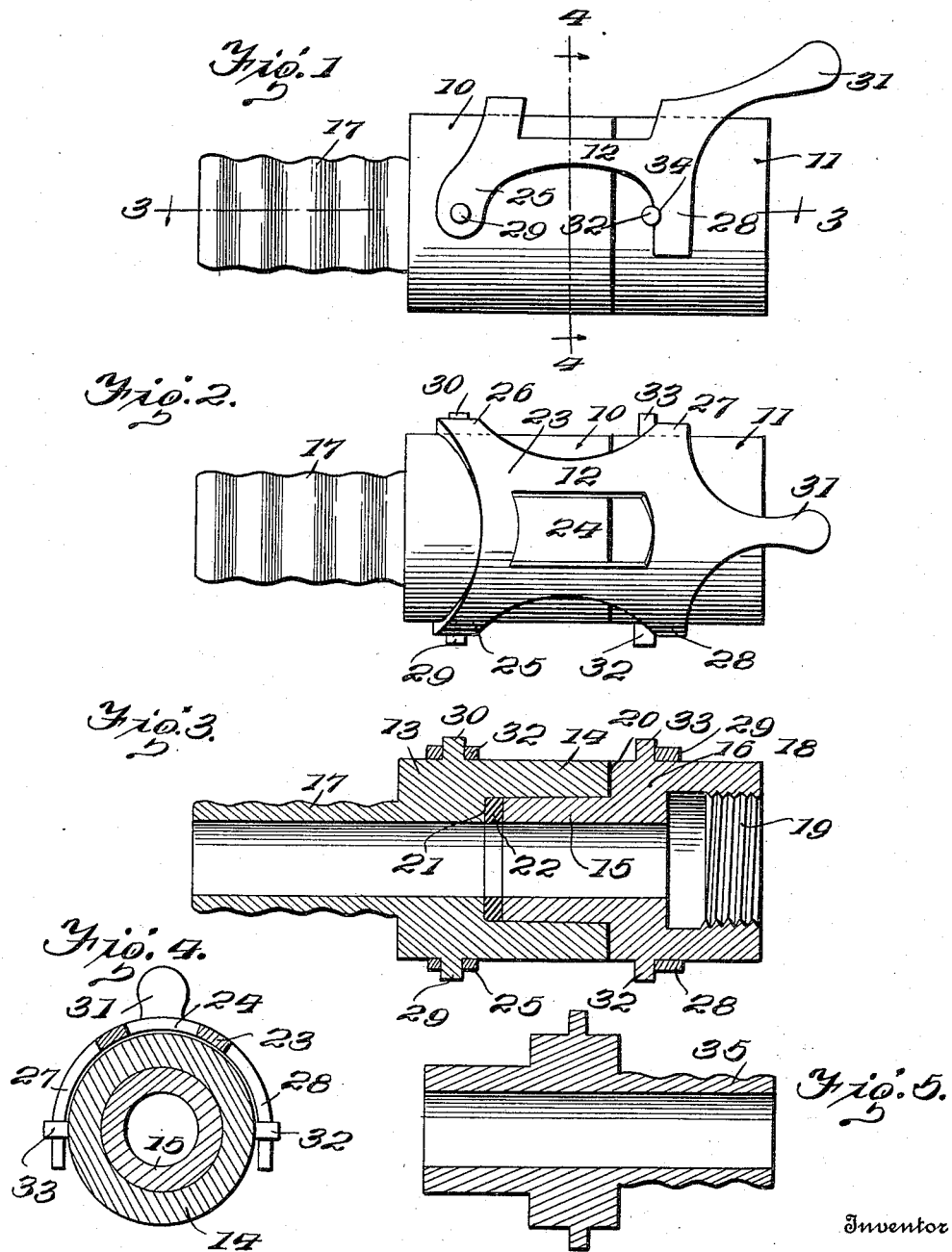

GEORGE L. McCLELLAN, OF GOLD HILL, OREGON.

HOSE-COUPLING.

1,148,913.  Specification of Letters Patent.  Patented Aug. 3, 1915.

Application filed August 12, 1913. Serial No. 784,386.

*To all whom it may concern:*

Be it known that I, GEORGE L. MCCLELLAN, citizen of the United States, residing at Gold Hill, in the county of Jackson and State of Oregon, have invented certain new and useful Improvements in Hose-Couplings, of which the following is a specification.

This invention relates to new and useful improvements in hose couplings, and as its principal object aims to provide a coupling equipped with a novel form of pivoted locking means which may be quickly and conveniently operated to positively seal the joint between the male and female member of the coupling, insuring the joint against leakage or accidental disconnection.

A further object is to construct the two sections of the coupling and the locking device with such regard to number, proportion and arrangement of parts, that they may be cheaply manufactured, will be durable and efficient in their operation, and may be readily applied to any hose lengths which the operator desires to connect.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is a side elevation, illustrating the male and female sections of the coupling in locked assembled relation; Fig. 2 is a top view illustrating the locking device in operative position; Fig. 3 is a section on the line 3—3 of Fig. 1; Fig. 4 is a section on the line 4—4 of Fig. 1; and Fig. 5 is a longitudinal section illustrating a modification of the male section of the coupling.

Proceeding now to the description of the drawings, the numerals 10, 11 and 12 designate respectively, and as entireties, the female and male sections of the coupling and the locking device employed in detachably coupling them. The member 10 consists essentially in a cored casting 13, formed integrally with which is a sleeve 14 adapted to receive a similar and smaller sleeve 15 formed integrally with a cored casting 16 which constitutes the body portion of the member 11. An externally screw-threaded nipple 17 extends from the member 13 and from the end thereof opposite the sleeve 14, being adapted to be threaded into one of the hose lengths.

As previously set forth, the cored casting 16 which constitutes the body portion of the male section of the coupling is equipped with an integrally formed sleeve 15 of such diameter that it will fit snugly into the sleeve 14. The member 16 is further provided with an integrally formed sleeve 18 larger in diameter than the member 15 which is interiorly screw-threaded, as indicated at 19, for the obvious purpose of receiving a threaded ring such as is customarily provided for the terminal of hose lengths.

It is to be noted that the annular shoulder formed on the casting 16 at 20 acts to limit the inward movement of the sleeve 16, consequently spacing the inner end thereof from the annular shoulder 21 of the member 13. In the space thus formed is disposed a washer 22, the obvious purpose of which is to tightly seal the joint between the sleeves 14 and 15, preventing the leakage of water through the coupling.

The locking device heretofore referred to as an entirety by the numeral 12 consists essentially in a bridge formed of any suitable resilient metal, although sheet steel has been found most efficient and practical. This bridge includes a body portion 23 which is in the formed nature of a transversely curved plate which is shaped to conform to the curvature of the coupling sections, and is provided with a central opening as at 24, the purpose of which is to make the bridge as light as possible, and reduce the cost of manufacture by making the bridge of the smallest amount of stock consistent with efficiency.

Four arcuate extensions are formed integrally with the body plate 23, as indicated at 25, 26, 27 and 28. The members 25 and 26 are, as will be noted upon reference to the drawings, transversely alined, and are shaped to conform to the outline of the coupling section, being provided at their free terminals with apertures, which permit the application of the extensions 25 and 26 to a pair of diametrically opposed lugs or pivot pins 29 and 30 formed integrally with the female section of the coupling and on the cored casting 13 thereof. Considering the pivoted terminal of the bridge as the rear end, thereof, it will be noted that the forward end of the body plate 23 is equipped with an integrally formed finger grip 31, which is directd upwardly and forwardly to permit the operator to pass his finger around the member 31 when the bridge is in locking position.

The extensions 27 and 28 which are formed at the advance terminal of the body plate 23, are transversely alined, and substantially similar in conformation to the members 25 and 26 and are adapted to engage a pair of diametrically opposed lugs 32 and 33 formed integrally with and extending laterally from the member 16 of the male section of the coupling. In this connection, it will be noted that the inner edges of the members 27 and 28 are formed with notches indicated at 34. These notches receive the lugs 32 and 33, and it is, therefore, apparent, that inasmuch as the members 27 and 28 are formed of resilient metal accidental displacement of the bridge from locked to unlocked position is effectually guarded against.

Attention is now called to the fact that in the provision of the opening 24, a terminal portion is defined at each end of the bridge connecting the adjacent extensions formed thereon, the connecting portion between each pair of extensions being disposed in substantially the same plane therewith and being arranged to extend over the members 10 and 11. In thus arranging the connecting portions referred to, the extensions are supported to minimize any tendency thereof to spread and to thus become disengaged in use. It is also to be observed that in the provision of the opening 24, a reduced connection is provided between the forwardly and rearwardly disposed extensions of the bridge which, in use, is disposed to flex longitudinally when the forwardly disposed extensions are engaged with the lugs 32 to permit the said extensions to readily ride over the said lugs when downward pressure is exerted upon the bridge and to also resiliently actuate the said extensions to maintain the lugs 32 seated firmly within the recesses 34.

In the modification of this invention, illustrated in Fig. 5, the sleeve 18 of the male section of the coupling has been replaced by an externally screw-threaded nipple 35 similar to the member 17 of the female section, so that, if desired, the user of the device may thread both sections of the coupling into the adjacent ends of the hose lengths.

From the foregoing, it will be apparent that there has been provided an efficient coupling equipped with a locking device which may be readily and conveniently operated to positively clamp the two sections of the coupling in sealed relation.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

In this connection, I desire to direct attention to the fact that in many instances it has been found expedient to pivot the bridge on the male member of the coupling and to form the lugs on the female member.

What I claim is:—

1. In a device of the character described, a male member, a female member, diametrically opposed lugs carried by the male member, and a locking bridge pivotally attached to the female member, said bridge including a transversely curved body plate adapted to partially incase the meeting terminals of the male and female members, a pair of rearwardly disposed extensions for pivoting the body plate to the female member, said extensions being joined by a connecting portion extending over the adjacent member, a pair of forwardly disposed extensions engageable with the lugs for holding the male and female members in assembled relation, said forwardly disposed extensions being also joined by a connecting portion extending over the adjacent member, the said connecting portions supporting the extensions in substantially the same vertical planes therewith, and members connecting the extensions, the said members being arranged in spaced relation to the pivot points of the extensions.

2. In a device of the character described, a male member, a female member, diametrically opposed lugs carried by the male member, and a resilient locking bridge pivotally attached to the female member, said bridge including a transversely curved body plate adapted to partially incase the meeting terminals of the male and female members, a pair of rearwardly disposed extensions for pivoting the body plate to the female member and a pair of forwardly disposed extensions engageable with the lugs for holding the male and female members in assembled relation, the body of the plate intermediate said forwardly and rearwardly disposed extensions providing a resilient connection between the said extensions.

3. A device of the character described including a male member, a female member, opposed lugs carried by the male member, and a locking bridge pivotally attached to the female member, said bridge including a body plate, a pair of rearwardly disposed extensions for pivoting the body plate to the female member, said extensions being joined by a connecting portion extending over the adjacent member, a pair of forwardly disposed extensions engageable with the lugs for holding the male and female members in assembled relation, said forwardly disposed extensions being also joined by a connecting portion extending over the adjacent member, and longitudinal members connecting said rearwardly and forwardly disposed extensions, said longitudinal members being inwardly spaced from the pivot points of said extensions and being adapted to bear against the said members.

In testimony whereof I affix my signature in presence of two witnesses.

GEORGE L. McCLELLAN [L. S.]

Witnesses:
H. D. REED,
LYNN W. SMITH.

Copies of this patent may be obtained for five cents each, by addressing the "Commissioner of Patents, Washington, D. C."